(12) United States Patent
Nakata et al.

(10) Patent No.: US 10,016,787 B2
(45) Date of Patent: Jul. 10, 2018

(54) METHOD FOR FORMING MULTILAYER COATED FILM

(71) Applicants: KANSAI PAINT CO., LTD., Amagasaki-shi (JP); TOYOTA JIDOSHA KABUSHIKI KAISHA, Toyota-shi (JP)

(72) Inventors: Munehiro Nakata, Miyoshi (JP); Mika Yoneyama, Hamamatsu (JP)

(73) Assignees: KANSAI PAINT CO., LTD., Amagasaki-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/446,538

(22) Filed: Mar. 1, 2017

(65) Prior Publication Data

US 2017/0252776 A1   Sep. 7, 2017

(30) Foreign Application Priority Data

Mar. 2, 2016   (JP) ................. 2016-040180

(51) Int. Cl.

| | |
|---|---|
| B05D 7/00 | (2006.01) |
| B05D 1/02 | (2006.01) |
| B05D 3/00 | (2006.01) |
| B05D 3/02 | (2006.01) |
| B05D 7/14 | (2006.01) |
| C09D 133/08 | (2006.01) |
| C09D 133/14 | (2006.01) |
| C09D 167/02 | (2006.01) |
| C09J 175/04 | (2006.01) |
| C25D 5/50 | (2006.01) |
| C08G 18/54 | (2006.01) |
| C08G 18/62 | (2006.01) |
| C08G 18/79 | (2006.01) |
| C08G 18/80 | (2006.01) |
| C09D 175/04 | (2006.01) |
| C08G 18/40 | (2006.01) |
| C08G 18/42 | (2006.01) |
| C25D 13/12 | (2006.01) |
| C25D 13/22 | (2006.01) |

(52) U.S. Cl.
CPC ............. *B05D 7/572* (2013.01); *B05D 1/02* (2013.01); *B05D 3/002* (2013.01); *B05D 3/0254* (2013.01); *B05D 7/14* (2013.01); *B05D 7/56* (2013.01); *C08G 18/4027* (2013.01); *C08G 18/423* (2013.01); *C08G 18/544* (2013.01); *C08G 18/6254* (2013.01); *C08G 18/792* (2013.01); *C08G 18/807* (2013.01); *C09D 133/08* (2013.01); *C09D 133/14* (2013.01); *C09D 167/02* (2013.01); *C09D 175/04* (2013.01); *C09J 175/04* (2013.01); *C25D 5/50* (2013.01); *C25D 13/12* (2013.01); *C25D 13/22* (2013.01)

(58) Field of Classification Search
None
See application file for complete search history.

(56) References Cited

U.S. PATENT DOCUMENTS

| | | |
|---|---|---|
| 6,863,929 B2 | 3/2005 | Watanabe et al. |
| 2003/0158321 A1 | 8/2003 | Watanabe et al. |
| 2012/0045632 A1 | 2/2012 | Low et al. |
| 2015/0275036 A1 | 10/2015 | Ichimura et al. |
| 2015/0275037 A1 | 10/2015 | Ichimura et al. |

FOREIGN PATENT DOCUMENTS

| | | | |
|---|---|---|---|
| JP | 2003211085 A | | 7/2003 |
| JP | 2005-225907 A | | 8/2005 |
| JP | 2005225907 A | * | 8/2005 |
| JP | 2006239535 A | | 9/2006 |
| JP | 2012524673 A | | 10/2012 |
| JP | 2015-193795 A | | 11/2015 |
| JP | 2015-193796 A | | 11/2015 |

* cited by examiner

*Primary Examiner* — Michael P Rodriguez

(74) *Attorney, Agent, or Firm* — Sughrue Mion, PLLC

(57) ABSTRACT

In a method for forming a multilayer coated film including an intermediate coated film, a base coated film, a clear coated film and an adhesive layer, an intermediate coating composition (X) contains a hydroxyl group-containing polyester resin (A), a melamine resin (B), a pyrazole-blocked polyisocyanate compound (C), a pigment (D), and an organic solvent (E), a content ratio (B/C) is from 5/35 to 20/15 in terms of solid content ratio, and a concentration (PWC) of the pigment (D) is from 40% to 60%. The cured intermediate coated film has, at 20° C., an elongation at break of 40% to 90%, a Young's modulus of 600 MPa to 1,600 MPa, and a Tukon hardness of 3 to 9.

4 Claims, No Drawings

METHOD FOR FORMING MULTILAYER COATED FILM

CROSS-REFERENCE TO RELATED APPLICATIONS

This application claims priority from Japanese Patent Application No. 2016-040180 filed on Mar. 2, 2016, the entire subject matter of which is incorporated herein by reference.

BACKGROUND OF THE INVENTION

Technical Field

The present invention relates to a method for forming a multilayer coated film where in coating an automotive body, the multilayer coated film is excellent in the chipping resistance and the adhesive strength when bonding to a member.

Background Art

On an automotive body, particularly, on an exterior panel part thereof, a multilayer coated film including an undercoat film excellent in the anticorrosive property, an intermediate coated film excellent in the smoothness and chipping resistance, and a top coated film excellent in the appearance and resistance to an environmental load is generally formed for the purpose of imparting excellent anticorrosive property and appearance.

In an automotive manufacturing specification, an adhesive layer is formed on the top coated film, and a glass member such as front glass or rear glass is generally fixed thereto with an adhesive.

One of the performances required of the multilayer coated film of an automobile is chipping resistance (chipping: damage to a coated film caused when hit by a small pebble, etc. flying from road), and a function is imparted mainly to an intermediate coated film with an attempt to enhance the chipping resistance, but in recent years, higher-level chipping resistance is demanded to satisfy needs of the market.

However, when the intermediate coated film is, for example, softened with the intention to raise the level of chipping resistance, the cohesive force of the intermediate coated film is reduced and in turn, the multilayer coated film in the bonded part to a member such as glass member may cause cohesion failure, or separation may occur between an electrodeposition coated film and the intermediate coated film, disadvantageously leading to defective bonding to a member.

For example, Patent Document 1 discloses a method for forming a coated film using an intermediate coating composition containing (a) a urethane-modified polyester resin obtained by reacting an aliphatic diisocyanate compound with a hydroxyl group-containing polyester resin obtained by polycondensation of an acid component containing 80 mol % or more of isophthalic acid, and a polyhydric alcohol; (b) a melamine resin; (c) a hexamethylene diisocyanate compound blocked by an active methylene group-containing compound; (d) a nonaqueous dispersion resin having a core-shell structure; and (e) a flat pigment.

Patent Document 2 discloses a multilayer coated film on an external panel of an automotive body, etc., which is a multilayer coated film having formed therein, in the following order, an electrodeposition coated film, an intermediate coated film, a base coated film and a clear coated film, wherein at −20° C., the intermediate coated film has a Young's modulus of 35,000 kg/cm² or more and an elongation at break of 2% or less and the clear coated film has a Young's modulus of 35,000 kg/cm² or less and an elongation at break of 5% or more.

However, in the method for forming a coated film of Patent Document 1 and the multilayer coated film of Patent Document 2, the chipping resistance may be insufficient.

Patent Document 3 discloses a multicoat coating system including an undercoat film composed of an undercoating composition containing a specific melamine resin and a polyester binder, and a multilayer coating including an adhesive layer composed of an adhesive of specific isocyanate base.

Patent Document 1: JP-A-2003-211085
Patent Document 2: JP-A-2006-239535
Patent Document 3: JP-T-2012-524673 (the term "JP-T" as used herein means a "published Japanese translation of a PCT patent application")

SUMMARY OF THE INVENTION

However, in the method for forming a coated film of Patent Document 1 and the multilayer coated film of Patent Document 2, the chipping resistance may be insufficient, and in the multilayer coating of Patent Document 3, although the adhesion to a member such as glass member may be good, the chipping resistance may be insufficient.

Accordingly, an aspect of the present invention provides a method for forming a multilayer coated film capable of forming a multilayer coated film where the chipping resistance is excellent, breakage of the coated film or interface separation, etc. between an undercoat film and an intermediate coated film are not caused, and the adhesive strength when bonding to a member is excellent.

As a result of many intensive studies, the present inventors have found that in a method for forming a multilayer coated film of applying, in the following order, an intermediate coating composition, an aqueous base coating composition, and a clear coating composition containing a hydroxyl group-containing acrylic resin and a polyisocyanate compound, thereby forming a multilayer coated film including an intermediate coated film, a base coated film and a clear coated film on a part of an electrodeposition coated automotive body, and further forming an adhesive layer on the clear coated film, when the intermediate coating composition contains a hydroxyl group-containing polyester resin, a melamine resin, a pyrazole-blocked polyisocyanate compound, a pigment and an organic solvent and when the concentration (PWC; Pigment Weight Content) of the pigment contained in the intermediate coating composition falls within a specific range and the elongation at break, Young's modulus and Tukon hardness, at 20° C., of the coated film formed of the intermediate coating composition fall within specific ranges, respectively, the above-described object can be attained. The present invention has been accomplished based on this finding.

An aspect of the present invention provides the following method for forming a multilayer coated film:

a method for forming a multilayer coated film on a part of an electrodeposition coated automotive body, the method including the following steps (1) to (5):

step (1): applying an intermediate coating composition (X) to an electrodeposition coated film, thereby forming an intermediate coated film on the electrodeposition coated film;

step (2): applying an aqueous base coating composition (Y) to the intermediate coated film formed in the step (1), thereby forming a base coated film on the intermediate coated film;

step (3): applying a clear coating composition (Z) containing a hydroxyl group-containing acrylic resin and a polyisocyanate compound to the base coated film formed in the step (2), thereby forming a clear coated film on the base coated film;

step (4): heat-curing the intermediate coated film formed in the step (1), the base coated film formed in the step (2) and the clear coated film formed in the step (3); and step (5): forming an adhesive layer on the clear coated film, wherein the intermediate coating composition (X) contains a hydroxyl group-containing polyester resin (A), a melamine resin (B), a pyrazole-blocked polyisocyanate compound (C), a pigment (D), and an organic solvent (E), a content ratio (B/C) of the melamine resin (B) to the pyrazole-blocked polyisocyanate compound (C) is from 5/35 to 20/15 in terms of solid content ratio, and a concentration (PWC) of the pigment (D) is from 40% to 60%, and the cured intermediate coated film after heat-curing the intermediate coated film has, at 20° C., an elongation at break of 40% to 90%, a Young's modulus of 600 MPa to 1,600 MPa, and a Tukon hardness of 3 to 9.

In the method for forming a multilayer coated film, it is preferred that a total solid content of the melamine resin (B) and pyrazole-blocked polyisocyanate compound (C) relative to a total solid content of the hydroxyl group-containing polyester resin (A), melamine resin (B) and pyrazole-blocked polyisocyanate compound (C) in the intermediate coating composition (X) is from 20 mass % to 50 mass %.

In the method for forming a multilayer coated film, it is preferred that in the step (1), the intermediate coating composition (X) is applied to have a film thickness of 10 μm to 40 μm based on the cured coated film.

In the method for forming a multilayer coated film in the present invention, the method includes applying an intermediate coating composition/an aqueous base coating composition/a hydroxyl group-containing acrylic resin.polyisocyanate curable clear coating composition to form a multilayer coated film on an electrodeposition coated film, and further includes forming an adhesive layer, and the concentration (PWC) of the pigment in the intermediate coating composition is from 40% to 60% and is higher than usual, a pyrazole-blocked polyisocyanate compound is used as a crosslinking agent in combination with a melamine resin, and the physical properties of the coated film (elongation at break and Young's modulus) and the hardness of the coated film, at 20° C., of the coated film formed of the intermediate coating composition are specified in specific ranges.

The PWC is adjusted to the above-described range, and a pyrazole-blocked polyisocyanate compound is contained as a crosslinking agent, whereby the curability can be enhanced; and the ratio of the melamine resin to the pyrazole-blocked polyisocyanate compound falls within the above-described specific range to further increase the cohesive force of the intermediate coated film, whereby the adhesive strength when bonding to a member can be enhanced, specifically, breakage of the multilayer coated film in the glass bonding part or separation at the electrodeposition/intermediate coated film interface can be prevented.

Furthermore, the physical properties (elongation at break and Young's modulus) and hardness, at 20° C., of the coated film formed of the intermediate coating composition are controlled to fall within specific ranges, whereby a multilayer coated film also having excellent chipping resistance can be obtained.

In this way, according to the method for forming the multilayer coated film in an aspect of the present invention, in a method for forming a coated film of applying an intermediate coating composition/an aqueous base coating composition/a hydroxyl group-containing acrylic resin.polyisocyanate curable clear coating composition to form a multilayer coated film on an electrodeposition coated film, and further forming an adhesive layer, a multilayer coated film having excellent chipping resistance and also having excellent adhesive strength when bonding to a member can be obtained.

DETAILED DESCRIPTION OF THE INVENTION

In the method for forming a multilayer coated film in an aspect of the present invention (hereinafter simply referred to "the method of the present invention" in some cases), the following steps (1) to (5) are performed to form a multilayer coated film on a part of an electrodeposition coated automotive body:

step (1): applying an intermediate coating composition (X) to an electrodeposition coated film, thereby forming an intermediate coated film on the electrodeposition coated film;

step (2): applying an aqueous base coating composition (Y) to the intermediate coated film formed in the step (1), thereby forming a base coated film on the intermediate coated film;

step (3): applying a clear coating composition (Z) containing a hydroxyl group-containing acrylic resin and a polyisocyanate compound to the base coated film formed in the step (2), thereby forming a clear coated film on the base coated film;

step (4): heat-curing the intermediate coated film formed in the step (1), the base coated film formed in the step (2) and the clear coated film formed in the step (3); and step (5): forming an adhesive layer on the clear coated film, The method for forming the multilayer coated film in an aspect of the present invention is described in detail below.

An object to be coated to which the method for forming a multilayer coated film in the present invention is applied is an electrodeposition coated automotive body, and examples of the material of the automotive body include, for example, a steel plate such as cold-rolled steel plate, galvanized steel plate, zinc alloy-coated steel plate, stainless steel plate and tin-coated steel plate; a metal substrate such as aluminum plate and aluminum alloy plate; and various plastic materials.

As the material of the automotive body, a material subjected to a surface treatment such as phosphate treatment, chromate treatment or composite oxide treatment may be suitably used.

The electrodeposition coating composition that can be used for electrodeposition coating may be either a cationic resin-based composition or an anionic resin-based composition and may be either a water-soluble composition or a water-dispersible composition, and a coating composition known per se can be used. In coating an automobile, from the standpoint of anticorrosive property, etc., a cationic resin-based composition is generally used, and a cationic electrodeposition coating composition containing a cationic resin can be suitably used also in the method of the present invention.

Specific examples of the cationic electrodeposition coating composition include, for example, a cationic electrodeposition coating composition containing a cationic base resin having a cationic group and a crosslinking functional group such as hydroxyl group, carboxyl group and amino group (e.g., an epoxy resin, an acrylic resin, a polybutadiene resin, each modified with an amino group-containing compound), and a crosslinking agent such as blocked polyisocyanate compound, epoxy resin and melamine resin.

In the cationic electrodeposition coating composition, a neutralizer for the base resin, a color pigment, an anticorrosive pigment, an extender pigment, a hydrophilic organic solvent, etc. are usually further blended, if desired.

The electrodeposition coating composition can be applied by an ordinary method depending on an electrodeposition coating composition to be used.

In the case of applying a cationic electrodeposition coating composition, specifically, electrodeposition coating may be performed in a usual manner, for example, by diluting the coating composition with deionized water to a solids mass concentration of about 5 mass % to about 40 mass % and keeping the pH at 5.5 to 8.0. The coated film can be heat-cured at a temperature of about 140° C. to about 210° C., preferably at a temperature of 150° C. to 180° C., for 10 minutes to 60 minutes, preferably for 20 minutes to 30 minutes. The thickness of the coated film is preferably from about 10 μm to about 60 μm, particularly from 15 μm to 30 μm, based on the cured coated film.

<Step (1)>

In the method of the present invention, first, in the step (1), an intermediate coating composition (X) is applied to an electrodeposition coated film that is a part of an electrodeposition coated automotive body, thereby forming an intermediate coated film on the electrodeposition coated film. In general, the intermediate coating composition contributes to the formation of an intermediate coated film layer between an undercoat film and a top coated film, thereby enhancing adhesion between the layers in the multilayer coated film, and is a coating composition applied with the purpose of, for example, hiding roughness on the surface of an object to be coated to enhance the finish appearance, or increasing the chipping resistance.

<<Intermediate Coating Composition (X)>>

In the method of the present invention, the intermediate coating composition (X) is a coating composition containing a hydroxyl group-containing polyester resin (A), a melamine resin (B), a pyrazole-blocked polyisocyanate compound (C), a pigment (D), and an organic solvent (E).

<<Hydroxyl Group-Containing Polyester Resin (A)>>

The hydroxyl group-containing polyester resin (A) can be synthesized by a known method of subjecting a polybasic acid and a polyhydric alcohol to an esterification reaction in an usual manner.

The hydroxyl group-containing polyester resin (A) preferably has an acid group such as carboxyl group.

The polybasic acid is a compound having two or more carboxyl groups per molecule and examples thereof include, for example, phthalic acid, isophthalic acid, terephthalic acid, succinic acid, adipic acid, azelaic acid, sebacic acid, naphthalenedicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methylhexahydrophthalic acid, and anhydrides thereof.

The polyhydric alcohol is a compound having two or more hydroxyl groups per molecule and examples thereof include, for example, glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol and hydroxypivalic acid-neopentyl glycol ester; a polylactonediol formed by adding lactones such as ε-caprolactone to the glycols above; polyester diols such as bis(hydroxyethyl)terephthalate; 1,3-cyclohexanedimethanol; 1,4-cyclohexanedimethanol; tricyclodecaneclimethanol; hydrogenated bisphenol A; hydrogenated bisphenol F; spiroglycol; dihydroxymethyltricyclodecane; glycerin; trimethylolpropane; trimethylolethane; diglycerin; triglycerin; 1,2,6-hexanetriol; pentaerythritol; dipentaerythritol; dipentaerythritol; sorbitol; mannitol; and a hydroxycarboxylic acid such as 2,2-dimethylolpropionic acid, 2,2-dimethylolbutanoic acid, 2,2-dimethylolpentanoic acid, 2,2-dimethylolhexanoic acid and 2,2-dimethyloloctanoic acid.

As the hydroxyl group-containing polyester resin (A), a fatty acid-modified polyester resin modified with, e.g., a (semi)drying oil fatty acid such as linseed oil fatty acid, coconut oil fatty acid, safflower oil fatty acid, soybean oil fatty acid, sesame oil fatty acid, perilla oil fatty acid, hempseed oil fatty acid, tall oil fatty acid and dehydrated castor oil fatty acid, may also be used. In general, the modification amount with such a fatty acid is suitably 30 mass % or less in terms of oil length. In addition, the hydroxyl group-containing polyester resin (A) may be a resin in which a part of a monobasic acid such as benzoic acid is reacted.

The hydroxyl group-containing polyester resin (A) may also be a resin in which an α-olefin epoxide such as propylene oxide or butylene oxide, a monoepoxy compound such as CARDURA E10 (produced by Japan Epoxy Resins Co., Ltd., trade name, a glycidyl ester of a synthetic hyperbranched saturated fatty acid), etc. is reacted with an acid group in the polyester resin.

In the case of introducing a carboxyl group into the polyester resin, the carboxyl group may be introduced, for example, by adding an acid anhydride to a hydroxyl group-containing polyester to cause half-esterification.

The hydroxyl value of the hydroxyl group-containing polyester resin (A) is preferably from 10 mg KOH/g to 250 mg KOH/g, particularly from 40 mg KOH/g to 170 mg KOH/g, from the viewpoint of finish appearance and curability of the coated film.

In the case where the hydroxyl group-containing polyester resin (A) has an acid group, the acid value is preferably from 1 mg KOH/g to 100 mg KOH/g, particularly from 5 mg KOH/g to 60 mg KOH/g, from the viewpoint of curability and adhesion of the coated film.

The number average molecular weight of the hydroxyl group-containing polyester resin (A) is preferably from 1,000 to 50,000, particularly from 1,000 to 10,000, from the viewpoint of curability and finish appearance of the coated film. Here, the number average molecular weight of the hydroxyl group-containing polyester resin (A) is determined by gel permeation chromatograph (GPC).

In addition to the hydroxyl group-containing polyester resin (A), the intermediate coating composition (X) may contain, as the base resin, a resin usually used for coating compositions, if desired. Specific examples of the resin include an acrylic resin, a polyester resin except for the hydroxyl group-containing polyester resin (A), an alkyd resin, a urethane resin, etc. each having a crosslinking functional group such as hydroxyl group.

<<Melamine Resin (B)>>

In an aspect of the present invention, a melamine resin (B) is contained as a crosslinking agent component of the intermediate coating composition (X).

As the melamine resin, a partially methylolated melamine resin or a fully methylolated melamine resin, obtained by the reaction of a melamine component and an aldehyde component, may be used. Examples of the aldehyde component include formaldehyde, paraformaldehyde, acetaldehyde, benzaldehyde, etc.

In addition, a methylolated melamine resin in which the methylol group is etherified in part or in whole with an appropriate alcohol may also be used. Examples of the alcohol to be used for the etherification include, for example, methyl alcohol, ethyl alcohol, n-propyl alcohol, isopropyl alcohol, n-butyl alcohol, isobutyl alcohol, 2-ethyl-1-butanol, and 2-ethyl-1-hexanol.

The melamine resin is preferably a methyl-etherified melamine resin obtained by etherifying, in part or in whole, the methylol group of a partially or fully methylolated melamine resin with methyl alcohol, a butyl-etherified melamine resin obtained by etherifying, in part or in whole, the methylol group of a partially or fully methylolated melamine resin with butyl alcohol, or a methyl-butyl mixture-etherified melamine resin obtained by etherifying, in part or in whole, the methylol group of a partially or fully methylolated melamine resin with methyl alcohol and butyl alcohol, more preferably a methyl-butyl mixture-etherified melamine resin.

The weight average molecular weight of the melamine resin is preferably from 400 to 6,000, more preferably from 500 to 4,000, still more preferably from 600 to 3,000.

A commercially available melamine resin can be used as the melamine resin. As the trade name of the commercially available melamine resin, examples thereof include, for example, "CYMEL 202", "CYMEL 203", "CYMEL 204", "CYMEL 211", "CYMEL 212" "CYMEL 238" "CYMEL 251" "CYMEL 253", "CYMEL 254", "CYMEL 303", "CYMEL 323", "CYMEL 324", "CYMEL 325", "CYMEL 327", "CYMEL 350", "CYMEL 370", "CYMEL 380", "CYMEL 385", "CYMEL 1156", "CYMEL 1158", "CYMEL 1116", and "CYMEL 1130" (trade names, all produced by Nihon Cytec Industries Inc.); "RESIMENE 735", "RESIMENE 740", "RESIMENE 741", "RESIMENE 745", "RESIMENE 746", and "RESIMENE 747" (trade names, all produced by Monsanto Co., Ltd.); "U-VAN 120", "U-VAN 20HS", "U-VAN 20SE", "U-VAN 2021", "U-VAN 2028", and "U-VAN 28-60" (trade names, all produced by Mitsui Chemicals, Inc.); and "SUMIMAL M55", "SUMIMAL M30W", and "SUMIMAL M50W" (trade names, all produced by Sumitomo Chemical Co., Ltd.).

<<Pyrazole-Blocked Polyisocyanate Compound (C)>>

In an aspect of the present invention, a pyrazole-blocked polyisocyanate compound (C) is further contained as a crosslinking agent component of the intermediate coating composition (X).

The pyrazole-blocked polyisocyanate compound (C) is a compound in which a free isocyanate group of a polyisocyanate compound is blocked using a pyrazole compound as a blocking agent.

When the blocked polyisocyanate compound is heated, for example, at 100° C. or more, preferably at 130° C. or more, an isocyanate group is regenerated and can easily react with a reactive group.

The polyisocyanate compound is a compound having two or more isocyanate groups per molecule.

Specific examples of the polyisocyanate compound include, for example, an aliphatic polyisocyanate, an alicyclic polyisocyanate, an aromatic-aliphatic polyisocyanate, an aromatic polyisocyanate, and derivatives of these polyisocyanates.

Examples of the aliphatic polyisocyanate include, for example, an aliphatic diisocyanate such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate and 2,6-diisocyanatomethylcaproate; and an aliphatic triisocyanate such as lysine ester triisocyanate, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of the alicyclic polyisocyanate include, for example, an alicyclic diisocyanate such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or a mixture thereof, and norbornane diisocyanate; and an alicyclic triisocyanate such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane and 6-(2-isocyanatoethyl)-2-isocyanatomethyl-2-(3-isocyanatopropyl)-bicyclo(2.2.1)heptane.

Examples of the aromatic-aliphatic polyisocyanates include, for example, an aromatic-aliphatic diisocyanate such as 1,3- or 1,4-xylylene diisocyanate or a mixture thereof, ω,ω'-diisocyanato-1,4-diethylbenzene, and 1,3- or 1,4-bis(1-isocyanato-1-methylethyl)benzene (common name: tetramethylxylylene diisocyanate) or a mixture thereof; and an aromatic-aliphatic triisocyanate such as 1,3,5-triisocyanatomethylbenzene.

Examples of the aromatic polyisocyanate include, for example, an aromatic diisocyanate such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or a mixture thereof, 2,4- or 2,6-tolylene diisocyanate or a mixture thereof, 4,4'-toluidine diisocyanate and 4,4'-diphenylether diisocyanate; an aromatic triisocyanate such as triphenylmethane-4,4',4"-triisocyanate, 1,3,5-triisocyanatobenzene and 2,4,6-triisocyanatotoluene; and an aromatic tetraisocyanate such as diphenylmethane-2,2',5,5'-tetraisocyanate.

Examples of the polyisocyanate derivative include, for example, a dimer, a trimer, a biuret, an allophanate, a carbodiimide, a urethodione, a urethoimine, an isocyanurate, an oxadiazinetrione, a polymethylene polyphenyl polyisocyanate (crude MDI, polymeric MDI) and crude TDI, of the above-mentioned polyisocyanate compounds.

Examples of the pyrazole compound as a blocking agent include 3,5-dimethylpyrazole, 3-methylpyrazole, 4-nitro-3,5-dimethylpyrazole 4-bromo-3,5-dimethylpyrazole, etc. Among these pyrazole compounds, 3,5-dimethylpyrazole is preferred.

As the blocked polyisocyanate compound of the intermediate coating composition (X), a blocked polyisocyanate compound using, as the blocking agent, a compound other than the pyrazole compound may also be used, if desired.

Examples of the blocking agent other than the pyrazole compound include, for example, a phenol-based blocking agent such as phenol, cresol, xylenol, nitrophenol, ethylphenol, hydroxydiphenyl, butylphenol, isopropylphenol, nonylphenol, octylphenol and methyl hydroxybenzoate; a lactam-based blocking agent such as ε-caprolactam, δ-valerolactam, γ-butyrolactam and β-propiolactam; an aliphatic alcohol-based blocking agent such as methanol, ethanol, propyl alcohol, butyl alcohol, amyl alcohol and lauryl alcohol; an ether-based blocking agent such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether and methoxymethanol; benzyl alcohol; glycolic acid; a glycol acid ester such as methyl glycolate, ethyl glycolate and butyl glycolate; lactic acid; a lactic acid ester such as methyl lactate, ethyl lactate and butyl lactate; an alcohol-based blocking agent, such as methylolurea, methylolmelamine, diacetone alcohol, 2-hydroxyethyl acrylate, and 2-hydroxyethyl methacrylate; an oxime-based blocking agent such as formamide oxime, acetamide oxime, acetoxime, methyl ethyl ketoxime, diacetyl monoxime, benzophenone oxime and cyclohexane oxime; an active methylene-based blocking agent such as dimethyl malonate, diethyl malonate, ethyl acetoacetate, methyl acetoacetate and acetylacetone; a mercaptan-based blocking agent such as butyl mercaptan, tert-butyl mercaptan, hexyl mercaptan, tert-dodecyl mercaptan, 2-mercaptobenzothiazole, thiophenol, methylthiophenol and ethylthiophenol; an acid amide-based blocking agent such as acetanilide, acetanisidide, acetotoluide, acrylamide, methacrylamide, acetic acid amide, stearic acid amide and benzamide; an imide-based blocking agent such as succinimide, phthalimide and maleimide; an amine-based blocking agent such as diphenylamine, phenylnaphthylamine, xylidine, N-phenylxylidine, carbazole, naphthylamine, butylamine, dibutylamine and butylphenylanime; an imidazole-based blocking agent such as imidazole and 2-ethylimidazole; a urea-based blocking agent such as urea, thiourea, ethyleneurea, ethylenethiourea and diphenyl urea; a carbamic acid ester-based blocking agent such as phenyl N-phenylcarbamate; an imine-based blocking agent such as ethyleneimine and propyleneimine; a sulfite-based blocking agent such as sodium bisulfite and potassium bisulfite.

In the intermediate coating composition (X), the content ratio (B/C) of the melamine resin (B) to the pyrazole-blocked polyisocyanate compound (C) is from 5/35 to 20/15 in terms of solids content ratio, and preferably from 10/30 to 15/20 in terms of solids content ratio.

If the content ratio (B/C) exceeds 20/15 and the proportion of the pyrazole-blocked polyisocyanate compound is small, a urethane bond is little produced by a crosslinking reaction and in turn, the chipping resistance may be insufficient.

If the content ratio (B/C) is less than 5/35 and the proportion of the pyrazole-blocked polyisocyanate compound is large, many urethane bonds are produced by a crosslinking reaction to provide a softer coated film, and the cohesive force of the coated film is thereby reduced, and as a result, the adhesive strength when bonding to a member such as glass member may decrease.

In the intermediate coating composition (X), as for the ratio between the hydroxyl group-containing polyester resin (A) and the crosslinking agent component (the total of the (B) component and the (C) component), it is preferred from the viewpoint of enhancing the chipping resistance and the adhesive strength when bonding to a member that, relative to the total solids content of both, the hydroxyl group-containing polyester resin (A) is from 50 mass % to 80 mass %, particularly from 55 mass % to 75 mass %, and the crosslinking agent component (the total of the (B) component and the (C) component) is from 20 mass % to 50 mass %, particularly from 25 mass % to 45 mass %.

In the intermediate coating composition (X), a crosslinking agent other than the melamine resin (B) and the pyrazole-blocked polyisocyanate compound (C) may also be used, if desired. Specific examples of the crosslinking agent include, for example, a urea resin, a polyhydrazide compound, a polysemicarbazide compound, a carbodiimide group-containing compound, an oxazoline group-containing compound, an epoxy compound, and a polycarboxylic acid. One of these crosslinking agents that can be used on an as-needed basis may be used alone, or two or more thereof may be used in combination.

<<Pigment (D)>>

As the pigment (D), a pigment usually employed for a coating composition may be used. Specifically, a color pigment such as titanium dioxide, zinc white, carbon black, phthalocyanine blue, Prussian blue, cobalt blue, azo pigment, phthalocyanine pigment, quinacridone pigment, isoindoline pigment, threne pigment and perylene pigment; an extender pigment such as clay, kaolin, baryta, barium sulfate, barium carbonate, calcium carbonate, silica, alumina white and talc; an effect pigment such as aluminum flake and mica flake; etc. may be suitably used.

In the intermediate coating composition (X), the pigment may be blended as a powder in the coating composition, or after the pigment is mixed and dispersed with a part of the resin component to prepare a pigment dispersion in advance, the pigment dispersion may be mixed together with the remaining resin component or other components to form a coating composition. In preparing the pigment dispersion, conventional coating composition additives such as anti-foaming agent, dispersant and surface regulator may be used, if desired. In view of dispersibility, the pigment above is preferably used as a powder having an average particle diameter of 0.01 μm to 6 μm.

As for the content of the pigment (D), from the viewpoint of satisfying both the chipping resistance and the adhesive strength when bonding to a member, PWC (Pigment Weight Content) is from 40% to 60%, preferably from 45% to 55%.

<<Organic Solvent (E)>>

Examples of the organic solvent (E) include, for example, a hydrocarbon-based solvent such as hexane, heptane, xylene and toluene; esters such as ethyl acetate and butyl acetate; an ether-based solvent such as ethylene glycol monomethyl ether; an alcohol-based solvent such as ethanol, propanol and 2-ethylhexyl alcohol; a ketone-based solvent such as methyl ethyl ketone and methyl isobutyl ketone; an aromatic hydrocarbon-based solvent such as SWASOL 310 and SWASOL 1000 (produced by Cosmo Oil Co., Ltd.); an aliphatic hydrocarbon-based solvent; an alicyclic hydrocarbon-based solvent; and an amide-based solvent. One of these organic solvents may be used alone, or two or more thereof may be used in combination.

In the intermediate coating composition (X), the content of the organic solvent (E) is usually from 20 mass % to 50 mass %, preferably on the order of 25 mass % to 40 mass %.

In the intermediate coating composition (X), a curing catalyst may be used from the viewpoint of enhancing the curability. As the curing catalyst, a sulfonic acid such as paratoluenesulfonic acid, dodecylbenzenesulfonic acid and dinonylnaphthalenesulfonic acid; a neutralized salt of the sulfonic acid with amine; a neutralized salt of a phosphoric acid ester compound with amine; etc., may be used for the melamine resin (B) out of the crosslinking agent component above.

An organic metal compound such as organotin compound may be used for the pyrazole-blocked polyisocyanate compound (C) out of the crosslinking agent component above.

Specific examples of the curing catalyst include, for example, an organic metal catalyst such as tin octylate, dibutyltin di(2-ethylhexanoate), dioctyltin di(2-ethylhexanoate), dioctyltin diacetate, dibutyltin dilaurate, dibutyltin oxide, dioctyltin oxide, zinc 2-ethylhexanoate and zinc octylate; and a tertiary amine.

Furthermore, in the intermediate coating composition (X), various additives such as pigment dispersant, antifoaming agent, antioxidant, ultraviolet absorber, light stabilizer, surface regulator and gloss control agent may be appropriately blended, if desired.

The intermediate coating composition (X) can be prepared by mixing and dispersing the above-described components. The solids content during coating is preferably adjusted to a range of 45 mass % to 75 mass %, particularly from 50 mass % to 70 mass %.

The intermediate coating composition (X) may be adjusted to a viscosity appropriate for the coating by adding an organic solvent and then applied and coated, if desired, by a conventional method such as rotary atomization coating, air spray or airless spray. From the viewpoint of smoothness, finish, etc. of the coated film, the coating composition may be applied to have a film thickness of 10 μm to 40 μm, preferably from 25 μm to 40 μm, based on the cured coated film.

The intermediate coated film obtained by applying the intermediate coating composition (X) can be cured per se, in the case of a baking drying, usually at a temperature of about 120° C. to about 180° C.

In the method for forming the multilayer coated film in an aspect of the present invention, the cured intermediated coated film after heat-curing the coated film (intermediate coated film) formed by the intermediate coating composition (X) must have, at 20° C., an elongation at break of 40% to 90%, a Young's modulus of 600 MPa to 1,600 MPa, and a Tukon hardness of 3 to 9. When the elongation at break, Young's modulus and Tukon hardness fall within the ranges above, both the chipping resistance and the adhesion to glass member can be satisfied. In the cured coated film, at 20° C., the elongation at break is preferably from 45% to 85%, more preferably from 50% to 80%, the Young's modulus is preferably from 700 MPa to 1,600 MPa, more preferably from 800 MPa to 1,500 MPa, and the Tukon hardness is more preferably from 4 to 8.

The physical values above are physical values of a cured coated film cured under the heating conditions that the thickness of the intermediate coated film is 50 μm and the coated film is kept at 140° C. for 18 minutes.

The elongation at break and the Young's modulus are results from applying the intermediate coating composition (X) onto a glass plate to have a film thickness of 50 μm based on the cured coated film, curing the coated film by heating under the conditions of keeping it at 140° C. for 18 minutes, then separating the coated film from the glass plate, cutting the coated film into a strip shape of 20 mm in length and 5 mm in width, and measuring the strip at a tensile speed of 4 mm/min in the longitudinal direction at 20° C. by means of "TENSILON UTM-II-20" (trade name, manufactured by Orientec Inc.).

The elongation at break is the ratio of an increment of length when the film is broken, to the original length before test. The Young's modulus is the rising edge slope of a stress-strain curve.

The Tukon hardness is the value measured using TUKON (manufactured by American Chain & Cable Company, micro hardness tester) after a test coated plate prepared by applying the intermediate coating composition (X) onto an electrodeposited plate to have a film thickness of 30 μm based on the cured coated film and curing the coated film by heating under the conditions of keeping the coated film at 140° C. for 18 minutes is allowed to stand in a constant-temperature room at 20° C. for 4 hours.

In the method of the present invention, usually, after the intermediate coated film is cured, an aqueous base coating composition (Y) is applied onto the intermediate coated film.

<Step (2)>

In the method of the present invention, next, an aqueous base coating composition (Y) is applied to the intermediate coated film formed in the step (1), thereby forming a base coated film on the intermediate coated film. The aqueous base coating composition (Y) is a coating composition for imparting a design property to the multilayer coated film formed in an aspect of the present invention and enhancing the design property and depth feeling by lamination with the intermediate coated film.

As for the aqueous base coating composition (Y), first, the case where the base coated film is a coated film taking on a solid color causing no change in the hue depending on the observation angle, is described. In this case, the base coated film can be formed by applying an aqueous colored base coating composition.

The aqueous colored base coating composition usually contains a color pigment. Specific examples of the color pigment include, for example, an organic pigment such as azo-based pigment, quinacridone-based pigment, diketopyrrolopyrrole-based pigment, perylene-based pigment, perinone-based pigment, benzimidazolone-based pigment, isoindoline-based pigment, isoindolinone-based pigment, azo metal chelate-based pigment, phthalocyanine-based pigment, indanthrone-based pigment, dioxazine-based pigment, threne-based pigment and indigo-based pigment; a metal oxide pigment such as titanium oxide pigment; and a carbon black pigment, and one of these pigments may be used alone, or two or more thereof may be used in combination.

In an aspect of the present invention, from the viewpoint of brightness, etc. of the multilayer coated film, the blending amount of the color pigment in the aqueous colored base coating composition is usually from 0.01 mass % to 150 mass %, preferably from 0.05 mass % to 120 mass %, relative to the total resin solids content in the aqueous colored base coating composition. The color pigment to be blended in the aqueous colored base coating composition may be blended as a powder in the coating composition, but after the color pigment is mixed and dispersed with a part of the resin component to prepare a pigment dispersion in advance, the pigment dispersion may be mixed together with the remaining resin component or other components to form a coating composition. In preparing the pigment dispersion, conventional coating composition additives such as antifoaming agent, dispersant and surface regulator may be used, if desired.

The aqueous colored base coating composition may usually contain a resin component as a vehicle. Specific examples of the resin component include those in which a base resin such as acrylic resin, polyester resin, alkyd resin and urethane resin, having a crosslinking functional group such as hydroxyl group, is used in combination with a crosslinking agent such as melamine resin, urea resin and polyisocyanate compound (including a blocked form), and these are used after being dissolved or dispersed in a solvent such as organic solvent and/or water.

Furthermore, in the aqueous colored base coating composition, a solvent such as water or organic solvent, various additives such as dispersant, antisettling agent, curing catalyst, antifoaming agent, antioxidant, ultraviolet absorber, surface regulator and rheology control agent, an extender pigment, etc. may be appropriately blended, if desired.

The aqueous colored base coating composition can be prepared by mixing and dispersing the above-described components. The solids content during coating is preferably adjusted to a range of 12 mass % to 60 mass %, particularly from 15 mass % to 50 mass %, based on the coating composition.

The aqueous colored base coating composition may be adjusted to a viscosity appropriate for the coating by adding water, an organic solvent, etc. and then applied by electrostatic coating, air spray, airless spray or other methods and from the viewpoint of smoothness, the film thickness is preferably from 5 µm to 30 µm, particularly from 5 µm to 25 µm, more particularly from 10 µm to 25 µm, based on the cured coated film.

Next, the case where the base coated film is a coated film taking on a metallic color causing a change in the hue depending on the observation angle, is described. In this case, the base coated film can be formed by applying an aqueous metallic base coating composition as the aqueous base coating composition (Y).

The aqueous metallic base coating composition usually contains a flake-like effect pigment with the purpose of imparting a particle feeling to the coated film. As the flake-like effect pigment, one kind or a combination of two or more kinds may be appropriately selected from light reflecting pigments and light interference pigments.

Specific examples of the light reflecting pigment include, for example, a flake-like metal pigment such as aluminum, copper, nickel alloy and stainless steel, a flake-like metal pigment in which the surface is coated with metal oxide, a flake-like metal pigment in which color pigment is chemically adsorbed or bonded to the surface, and a flake-like aluminum pigment in which an aluminum oxide layer is formed on the surface by inducing an oxidation reaction. Among these, from the viewpoint of particle feeling or finish appearance, a flake-like aluminum pigment may be suitably used.

The flake-like aluminum pigment is generally produced by grinding and milling aluminum in the presence of a liquid grinding medium with use of a grinding aid in a ball mill or an attritor mill. As the grinding aid, a higher fatty acid such as oleic acid, stearic acid, isostearic acid, lauric acid, palmitic acid and myristic acid, an aliphatic amine, an aliphatic amide, an aliphatic alcohol, etc. may be used. As the liquid grinding medium, an aliphatic hydrocarbon such as mineral spirit may be used.

The flake-like aluminum pigment can be roughly classified into a leafing type and a non-leafing type depending on the kind of the grinding aid. When the leafing-type pigment is blended in the coating composition, flakes are arranged on the surface of the coated film (leafing) obtained by applying the coating composition, giving a finish with strong metallic feeling, and since the pigment has heat-reflecting action and exerts rust-preventing power, this type is often used for various building materials including a tank, a duct, pipings and roofing of production equipment, etc. In an aspect of the present invention, a flake-like aluminum pigment of a leafing type may be used, but in the case of using a flake-like aluminum pigment of this type, attention is required, because although it varies depending on the blending amount, the pigment may completely hide the surface by the effect of surface tension of the grinding aid in the process of forming the coated film and a particle feeling may not be expressed. From this viewpoint, a flake-like aluminum pigment of a non-leafing type is preferably used.

As for the size of the flake-like aluminum pigment, from the viewpoint of finish appearance, highlight brightness and particle feeling of the multilayer coated film, a pigment having an average particle diameter of 8 µm to 25 µm, particularly from 10 µm to 18 µm, is preferably used, and the thickness is preferably from 0.2 µm to 1.0 µm. The particle diameter and thickness as used herein indicate the median diameter in a volume-basis particle size distribution measured by the laser diffraction scattering method by using a Microtrac particle size distribution measuring apparatus, MT3300 (trade name, manufactured by Nikkiso Co., Ltd.).

If the average particle diameter exceeds the upper limit above, the particle feeling of the coated film obtained becomes excessive, and this is sometimes disadvantageous in terms of design property, whereas if it is less than the lower limit, the particle feeling may be insufficient.

In the aqueous metallic base coating composition, a light interference pigment may be used as the flake-like effect pigment.

As the light interference pigment, specifically, a pigment obtained by coating a semitransparent substrate, such as natural mica, artificial mica, alumina flake, silica flake and glass flake, with a metal oxide may be used.

The metal oxide-coated mica pigment is a pigment in which the substrate is natural mica or artificial mica and the substrate surface is coated with a metal oxide. The natural mica is a flake-like substrate obtained by grinding mica from ore, and the artificial mica is synthesized by heating an industrial raw material, such as $SiO_2$, MgO, $Al_2O_3$, $K_2SiF_6$ or $Na_2SiF_6$, melting the raw material at a high temperature of about 1,500° C., and cooling the melt for crystallization. In this mica, as compared with natural mica, the impurity content is small, and the size or thickness is uniform. Specifically, fluorine-type mica ($KMg_3AlSi_3O_{10}F_2$), potassium tetrasilicon mica ($KMg_{2.5}AlSi_4O_{10}F_2$), sodium tetrasilicon mica ($NaMg_{2.5}AlSi_4O_{10}F_2$), Na taeniolite ($NaMg_2LiSi_4O_{10}F_2$), LiNa taeniolite ($LiNaMg_2LiSi_4O_{10}F_2$), etc. are exemplified. Examples of the metal oxide coat include titanium oxide and iron oxide. An interference color can be developed by the metal oxide coat.

The metal oxide-coated alumina flake pigment is a pigment in which the substrate is alumina flake and the substrate surface is coated with a metal oxide. The alumina flake means a flake-like (foil-like) aluminum oxide and is colorless and transparent. The alumina flake need not be an aluminum oxide single component and may contain an oxide of other metals. Examples of the metal oxide coat include titanium oxide and iron oxide. An interference color can be developed by the metal oxide coat.

The metal oxide-coated silica flake pigment is a pigment in which flake-like silica as a substrate having smooth surface and uniform thickness is coated with a metal oxide having a refractive index different from that of the substrate. Examples of the metal oxide coat include titanium oxide and iron oxide. An interference color can be developed by the metal oxide coat.

The metal oxide-coated glass flake pigment is a pigment in which a flake-like glass substrate is coated with a metal oxide, and since the substrate surface is smooth, strong light reflection is caused to express a particle feeling. Examples of the metal oxide coat include titanium oxide and iron oxide. An interference color can be developed by the metal oxide coat.

The light interference pigment may be subjected to a surface treatment so as to enhance the dispersibility, water resistance, chemical resistance, weather resistance, etc.

As for the size of the light interference pigment, in the case of a light interference pigment using natural mica, artificial mica, alumina flake or silica flake as the substrate, from the viewpoint of finish appearance or particle feeling of the coated film, a pigment having an average particle diameter of 5 µm to 30 µm, particularly from 7 µm to 25 µm, may be suitably used.

In the case of a light interference pigment using glass flake as the substrate, from the viewpoint of particle feeling of the coated film, a pigment having an average particle diameter of 15 µm to 100 µm, particularly from 17 µm to 45 µm, may be suitably used.

A light interference pigment having a thickness of 0.05 µm to 7.0 µm, particularly from 0.1 µm to 3 µm, is preferably used.

The particle diameter and thickness as used herein indicate the median diameter in a volume-basis particle size distribution measured by the laser diffraction scattering method by using a Microtrac particle size distribution measuring apparatus, MT3300 (trade name, manufactured by Nikkiso Co., Ltd.).

If the average particle diameter exceeds the upper limit, the particle feeling of the multilayer coated film, developed by the light interference pigment, becomes excessive, and this is sometimes disadvantageous in terms of design property, whereas if it is less than the lower limit, the particle feeling may be insufficient.

From the viewpoint of finish appearance or particle feeling of the coated film obtained, the content of the flake-like effect pigment in the aqueous metallic base coating composition is, in total, preferably from 0.01 mass % to 25 mass %, particularly from 0.01 mass % to 15 mass %, more particularly from 0.05 mass % to 5 mass %, relative to the total solids content of the resin composition in the coating composition.

The aqueous metallic base coating composition may contain a color pigment with the purpose of adjusting the hue and brightness of the coated film obtained. Specific examples of the color pigment include, for example, an inorganic pigment, e.g., a transparent iron oxide pigment, a composite oxide pigment such as titanium yellow, a titanium oxide pigment containing fine-particle titanium oxide, and a carbon black pigment; and an organic pigment such as azo-based pigment, quinacridone-based pigment, diketopyrrolopyrrole-based pigment, perylene-based pigment, perinone-based pigment, benzimidazolone-based pigment, isoindoline-based pigment, isoindolinone-based pigment, azo-metal chelate pigment, phthalocyanine-based pigment, indanthrone-based pigment, dioxazine-based pigment, threne-based pigment and indigo-based pigment. One of these may be used alone, or two or more thereof may be used in combination.

The color pigment may be blended as a powder in the coating composition, or after the color pigment is mixed and dispersed with a part of the resin composition to prepare a pigment dispersion in advance, the pigment dispersion may be mixed together with the remaining resin component or other components to form a coating composition. In preparing the pigment dispersion, conventional coating composition additives such as antifoaming agent, dispersant and surface regulator may be used, if desired.

In the case of incorporating a color pigment into the aqueous metallic base coating composition, from the viewpoint of brightness, etc. of the multilayer coated film, the blending amount thereof is usually from 0.01 mass % to 10 mass %, preferably from 0.01 mass % to 5 mass %, relative to the total solids content of the resin composition in the coating composition.

The aqueous metallic base coating composition usually contains a resin composition as a vehicle-forming component. Specific examples of the resin composition include those in which a base resin such as acrylic resin, polyester resin, alkyd resin and urethane resin, having a crosslinking functional group such as hydroxyl group, is used in combination with a crosslinking agent such as melamine resin, urea resin and polyisocyanate compound (including a blocked form), and these are used after being dissolved or dispersed in a solvent such as organic solvent and/or water.

Furthermore, in the aqueous metallic base coating composition, a solvent such as water or organic solvent, various additives such as pigment dispersant, curing catalyst, antifoaming agent, antioxidant, ultraviolet absorber and surface regulator, a gloss control agent, an extender pigment, etc. may be appropriately blended, if desired.

The aqueous metallic base coating composition is prepared by mixing and dispersing the above-described components. The solids content during coating is preferably adjusted to a range of 12 mass % to 60 mass %, particularly from 15 mass % to 50 mass %, based on the coating composition.

The aqueous metallic base coating composition may be adjusted to a viscosity appropriate for the coating by adding water or an organic solvent and then applied by a conventional method such as rotary atomization coating, air spray or airless spray.

From the viewpoint of smoothness, etc. of the coated film, the coating composition is preferably applied to have a film thickness of 10 µm to 25 µm based on the cured coated film and may be applied to have a film thickness of more preferably from 10 µm to 20 µm, still more preferably from 13 µm to 17 µm.

The aqueous coating composition as used in an aspect of the present invention is a term contrasted with an organic solvent-based coating composition and in general, means a coating composition obtained by dispersing and/or dissolving a coating film-forming resin, a pigment, etc. in water or a medium containing water as the main component (aqueous medium).

The base resin of the resin composition of the aqueous base coating composition (Y) preferably has an acid group, and in the case of dispersion in water, from the viewpoint of enhancing water dispersibility, the acid group is preferably neutralized with a neutralizer so as to facilitate mixing and dispersion in water.

The neutralizer is not particularly limited as long as it can neutralize an acid group, and examples thereof include a basic compound such as sodium hydroxide, potassium hydroxide, trimethylamine, 2-(dimethylamino)ethanol, 2-amino-2-methyl-1-propanol, triethylamine and aqueous ammonia.

The base coated film obtained by applying the aqueous base coating composition (Y) can be cured per se, in the case of a baking drying type, usually at a temperature of about 50° C. to about 180° C., and in the case of a normal temperature drying type or a forced drying type, can be cured usually at a temperature from room temperature to about 80° C.

In an aspect of the present invention, a clear coating composition (Z) is usually applied onto the uncured base coated film without curing the base coated film.

<Step (3)>

In the method of the present invention, a clear coating composition (Z) is applied to the base coated film obtained by applying the aqueous base coating composition (Y) as described above, thereby forming a clear coated film on the base coated film.

Before applying a clear coating composition (Z), the base coated film is preferably subjected to preheating, air-blowing, etc. under the heating conditions causing substantially no curing of the coated film. The preheating temperature is preferably from 40° C. to 100° C., more preferably from 50° C. to 90° C., still more preferably from 60° C. to 80° C. The preheating time is preferably from 30 seconds to 15 minutes, more preferably from 1 minute to 10 minutes, still more preferably from 2 minutes to 5 minutes. The air-blowing can be performed, for example, by blowing air at normal temperature or heated to a temperature of 25° C. to 80° C. onto the coated surface of the object to be coated for from 30 seconds to 15 minutes.

The base coated film is subjected, if desired, to the preheating, air-blowing, etc. before applying the clear coating composition (Z), and the solids content in the coated film is preferably thereby adjusted to a range of usually from 70 mass % to 100 mass %, preferably from 80 mass % to 100 mass %, still more preferably from 90 mass % to 100 mass %.

<<Clear Coating Composition (Z)>>

In the method of the present invention, the clear coating composition (Z) is a clear coating composition containing a hydroxyl group-containing acrylic resin and a polyisocyanate compound.

The hydroxyl group-containing acrylic resin can be produced by copolymerizing a hydroxyl group-containing unsaturated monomer (M-1) and another copolymerizable unsaturated monomer (M-2) by a conventional method.

The hydroxyl group-containing unsaturated monomer (M-1) is a compound having one hydroxyl group and one unsaturated bond per molecule, and the hydroxyl group mainly acts as a functional group reacting with a crosslinking agent. Specifically, the monomer is preferably a monoesterified product of an acrylic acid or a methacrylic acid with a dihydric alcohol having a carbon number of 2 to 10, and examples of the monoesterified product include, for example, a hydroxyalkyl (meth)acrylate such as 2-hydroxyethyl (meth)acrylate, 2-hydroxypropyl (meth)acrylate, 3-hydroxypropyl (meth)acrylate and 4-hydroxybutyl (meth)acrylate. Furthermore, examples of the monomer also include a ring-opening adduct of the hydroxyalkyl (meth)acrylate above with lactones such as ε-caprolactone. Specific examples of the hydroxyl group-containing unsaturated monomer (M-1) include, for example, "PLACCEL FA-1", "PLACCEL FA-2", "PLACCEL FA-3", "PLACCEL FA-4", "PLACCEL FA-5", "PLACCEL FM-1", "PLACCEL FM-2", "PLACCEL FM-3", "PLACCEL FM-4" and "PLACCEL FM-5" (trade names, all produced by Daicel Chemical Industries, Ltd.).

The blending ratio of the hydroxyl group-containing unsaturated monomer (M-1) in the hydroxyl group-containing acrylic resin is preferably from 20 mass % to 50 mass %, particularly from 25 mass % to 45 mass %, based on the total amount of the monomer mixture.

If the blending ratio of the hydroxyl group-containing unsaturated monomer (M-1) is less than 20 mass %, crosslinking may insufficiently proceed in the cured coated film, making it difficult to obtain predetermined scratch resistance. On the other hand, if the blending ratio exceeds 50 mass %, compatibility or copolymerization reactivity with another copolymerizable unsaturated monomer (M-2) and furthermore, compatibility with the obtained hydroxyl group-containing acrylic resin and a polyisocyanate compound (B) may be reduced to deteriorate the finish appearance of the coated film.

In this specification, "(meth)acrylate" means "acrylate or methacrylate".

Another copolymerizable unsaturated monomer (M-2) is a compound having one unsaturated bond per molecule, other than the hydroxyl group-containing unsaturated monomer (M-1), and specific examples thereof are recited in the following (1) to (8).

(1) Acid Group-Containing Unsaturated Monomer:

This is a compound having one or more acid groups and one unsaturated bond per molecule, and examples thereof include a carboxyl group-containing unsaturated monomer such as (meth)acrylic acid, crotonic acid, itaconic acid, maleic acid and maleic anhydride; a sulfonic acid group-containing unsaturated monomer such as vinylsulfonic acid and sulfoethyl (meth)acrylate; and an acidic phosphoric acid ester-based unsaturated monomer such as 2-(meth)acryloyloxyethyl acid phosphate, 2-(meth)acryloyloxypropyl acid phosphate, 2-(meth)acryloyloxy-3-chloropropyl acid phosphate and 2-methacryloyloxyethylphenyl phosphoric acid. One of these may be used, or two or more thereof may be used in combination. The acid group-containing unsaturated monomer can act also as an internal catalyst at the time of crosslinking reaction of the (A) component with a crosslinking agent, and the use amount thereof is from 0.1 mass % to 5 mass %, preferably from 0.1 mass % to 3 mass %, based on the total amount of the monomer mixture constituting the hydroxyl group-containing acrylic resin.

(2) Monoesterified Product of Acrylic Acid or Methacrylic Acid with Monohydric Alcohol Having Carbon Number of 1 to 20:

Examples thereof include, for example, methyl (meth)acrylate, ethyl acrylate, ethyl (meth)acrylate, propyl(meth)acrylate, n-butyl (meth)acrylate, iso-butyl (meth)acrylate, tert-butyl (meth)acrylate, 2-ethylhexyl (meth)acrylate, isooctyl (meth)acrylate, isomyristyl (meth)acrylate, Isostearyl Acrylate (trade name, produced by Osaka Organic Chemical Industry, Ltd.), cyclohexyl (meth)acrylate, lauryl (meth)acrylate, isobornyl (meth)acrylate, tricyclodecanyl (meth)acrylate, adamantyl (meth)acrylate, 3,5-dimethyladamantyl (meth)acrylate, 3-tetracyclododecyl methacrylate, tridecyl (meth)acrylate, stearyl (meth)acrylate, 4-methylcyclohexylmethyl (meth)acrylate, 4-ethylcyclohexylmethyl (meth)acrylate, 4-methoxycyclohexylmethyl (meth)acrylate, tert-butylcyclohexyl (meth)acrylate, cyclooctyl (meth) acrylate, cyclododecyl (meth)acrylate, and tetrahydrofurfuryl (meth)acrylate.

(3) Alkoxysilane Group-Containing Unsaturated Monomer:

Examples thereof include, for example, vinyltrimethoxysilane, vinyltriethoxysilane, acryloxyethyltrimethoxysilane, methacryloxyethyltrimethoxysilane, acryloxypropyltrimethoxysilane, methacryloxypropyltrimethoxysilane, acryloxypropyltriethoxysilane, methacryloxypropyltriethoxysilane, and vinyltris(β-methoxyethoxy)silane. Among these, preferable examples of the alkoxysilyl group-containing unsaturated monomers include vinyltrimethoxysilane, γ-acryloxypropyltrimethoxysilane, γ-methacryloxypropyltrimethoxysilane, etc.

(4) Aromatic Unsaturated Monomer:

Examples thereof include, for example, styrene, α-methylstyrene, and vinyltoluene.

(5) Glycidyl Group-Containing Unsaturated Monomer:

This is a compound having one glycidyl group and one unsaturated bond per molecule and specific examples thereof include glycidyl acrylate, glycidyl methacrylate, etc.

(6) Nitrogen-Containing Unsaturated Monomer:

Examples thereof include, for example, (meth)acrylamide, dimethylacrylamide, N,N-dimethylpropylacrylamide, N-butoxymethylacrylamide, N-methylolacrylamide, N-methylolmethacrylamide, diacetone acrylamide, N,N-dimethylaminoethyl (meth)acrylate, vinylpyridine, and vinylimidazole.

(7) Other Vinyl Compounds:

Examples thereof include, for example, vinyl acetate, vinyl propionate, and vinyl chloride, and include VEOVA 9 and VEOVA 10 (Japan Epoxy Resin Co., Ltd.) which are a vinyl versatate.

(8) Unsaturated Bond-Containing Nitrile-Based Compound:

Examples thereof include, for example, acrylonitrile and methacrylonitrile.

One of these other copolymerizable unsaturated monomers (M-2) may be used alone, or two or more thereof may be used in combination.

The hydroxyl group-containing acrylic resin can be obtained by copolymerizing a monomer mixture including the monomers (M-1) and (M-2).

The copolymerization method for obtaining the hydroxyl group-containing acrylic resin by copolymerizing the above-described monomer mixture is not particularly limited, and a copolymerization method known per se may be used, but among others, a solution polymerization method of performing polymerization in an organic solvent in the presence of a polymerization initiator is suitably used.

As the organic solvent to be used in the solution polymerization method above, examples thereof include, for example, an aromatic solvent such as toluene, xylene and SWASOL 1000 (trade name, produced by Cosmo Oil Co., Ltd., a high-boiling-point oil-based solvent); an ester-based solvent such as ethyl acetate, 3-methoxybutyl acetate, ethylene glycol ethyl ether acetate and propylene glycol methyl ether acetate; a ketone-based solvent such as methyl ethyl ketone, methyl isobutyl ketone and methyl amyl ketone; propyl propionate, butyl propionate, and ethoxyethyl propionate.

One of these organic solvents may be used alone, or two or more thereof may be used in combination, but from the viewpoint of the solubility of the resin, an ester-based solvent or a ketone-based solvent, each having a high boiling point, is preferably used. In addition, a high-boiling-point aromatic solvent may also be appropriately combined and used.

As the polymerization initiator that can be used in the copolymerization of the hydroxyl group-containing acrylic resin, examples thereof include a radical polymerization initiator known per se, such as 2,2'-azobisisobutyronitrile, benzoyl peroxide, di-tert-butyl peroxide, di-tert-amyl peroxide, tert-butyl peroctoate and 2,2'-azobis(2-methylbutyronitrile).

The hydroxyl value of the hydroxyl group-containing acrylic resin is preferably from 80 mg KOH/g to 200 mg KOH/g, more preferably from 100 mg KOH/g to 170 mg KOH/g. If the hydroxyl value is less than 80 mg KOH/g, the crosslinking density may be low, leading to insufficient scratch resistance. If the hydroxyl value exceeds 200 mg KOH/g, the water resistance of the coated film may be reduced.

The weight average molecular weight of the hydroxyl group-containing acrylic resin is from 2,500 to 40,000, preferably from 5,000 to 30,000. If the weight average molecular weight is less than 2,500, the performance of the coated film, such as acid resistance, may be reduced, whereas if it exceeds 40,000, the smoothness of the coated film and in turn, the finish may be deteriorated.

In this specification, the weight average molecular weight is the value calculated from a chromatogram measured by gel permeation chromatography, based on the molecular weight of standard polystyrene. As for the gel permeation chromatograph, "HLC8120GPC" (manufactured by Tosoh Corporation) was used. The measurement was performed using four columns of "TSKgel G-4000HXL", "TSKgel G-3000HXL", "TSKgel G-2500HXL" and "TSKgel G-2000HXL" (all manufactured by Tosoh Corporation, trade names) under the conditions of mobile phase: tetrahydrofuran; measurement temperature: 40° C., flow velocity: 1 cc/min, and detector: RI.

The glass transition temperature of the hydroxyl group-containing acrylic resin is from −40° C. to 85° C., preferably from −30° C. to 80° C. If the glass transition temperature is less than −40° C., the hardness of the coated film may be insufficient, and if it exceeds 85° C., the smoothness of the coated surface of the coated film may be reduced.

In the present specification, the glass transition temperature (° C.) of the copolymer can be calculated using the following equations:

$$1/Tg(K) = (W1/T1) + (W2/T2) + \ldots$$

$$Tg(°\ C.) = Tg(K) - 273$$

In which W1, W2, . . . are weight percent of each of the monomers to be used for coplymerization, and T1, T2, . . . stand for Tg (K) of homopolymer of each monomer. Furthermore, T1, T2, . . . are the value found in Polymer Handbook III (Second Edition; edited by J. Brandrup, E. H. Immergut) III, pages 139-179. Where Tg of a homopolymer of any monomer is not precisely known, static glass transition temperature of the same homopolymer is used as the glass transition temperature (° C.). For example, differential scanning calorimeter, "DSC-220U" (manufactured by SEIKO Instruments Inc.) is used to measure calorific change of a sample taken into its measuring cup and from which the solvent is completely removed by vacuum suction, under a temperature rise rate of 3° C./min within a range of −20° C. to +200° C., and the first baseline change point on the low temperature side is recorded as the static glass transition temperature.

Other than the hydroxyl group-containing acrylic resin, a hydroxyl group-containing resin usually used for coating compositions, such as polyester resin, polyether resin and polyurethane reins, may be incorporated as a base resin, if desired.

One of the above-described hydroxyl group-containing acrylic resins may be used alone, or two or more thereof may be used in combination.

The polyisocyanate compound is a compound having two or more free isocyanate groups per molecule, and those conventionally used for the production of a polyurethane may be used. Examples thereof include an aliphatic polyisocyanate, an alicyclic polyisocyanate, an aromatic-aliphatic polyisocyanate, an aromatic polyisocyanate, and derivatives of these polyisocyanates.

Examples of the aliphatic polyisocyanate include, for example, an aliphatic diisocyanate such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate and 2,6-diisocyanatomethylcaproate; and an aliphatic triisocyanate such as lysine ester triisocyanate, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of the alicyclic polyisocyanate include, for example, an alicyclic diisocyanate such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or a mixture thereof, and norbornane diisocyanate; and an alicyclic triisocyanate such as 1,3,5-triisocyanatocyclohexane, 1,3,5-trimethylisocyanatocyclohexane, 2-(3-isocynatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane and 6-(2-isocyanatoethyl)-2-isocyanatomethyl-2-(3-isocyanatopropyl)-bicyclo(2.2.1)heptane.

Examples of the aromatic-aliphatic polyisocyanates include, for example, an aromatic-aliphatic diisocyanate such as 1,3- or 1,4-xylylene diisocyanate or a mixture thereof, ω,ω'-diisocyanato-1,4-diethylbenzene, and 1,3- or 1,4-bis(1-isocyanato-1-methylethyl)benzene (common name: tetramethylxylylene diisocyanate) or a mixture thereof; and an aromatic-aliphatic triisocyanate such as 1,3,5-triisocyanatomethylbenzene.

Examples of the aromatic polyisocyanate include, for example, an aromatic diisocyanate such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or a mixture thereof, 2,4- or 2,6-tolylene diisocyanate or a mixture thereof, 4,4'-toluidine diisocyanate and 4,4'-diphenylether diisocyanate; an aromatic triisocyanate such as triphenylmethane-4,4',4'''-triisocyanate, 1,3,5-triisocyanatobenzene and 2,4,6-triisocyanatotoluene; and an aromatic tetraisocyanate such as 4,4'-diphenylmethane-2,2',5,5'-tetraisocyanate.

Examples of the polyisocyanate derivative include, for example, a dimer, a trimer, a biuret, an allophanate, a carbodiimide, a urethodione, a urethoimine, an isocyanurate, an oxadiazinetrione, a polymethylene polyphenyl polyisocyanate (crude MDI, polymeric MDI), and crude TDI of the above-mentioned polyisocyanate compounds.

One of these polyisocyanate compounds may be used alone, or two or more thereof may be used in combination. Among thee polyisocyanate compounds, from the viewpoint of scratch resistance, weather resistance, etc., an aliphatic diisocyanate and a derivative thereof may be suitably used.

The polyisocyanate compound may be a blocked polyisocyanate compound in which a free isocyanate group is blocked with a blocking agent. When the blocked isocyanate group is heated to a dissociation temperature of the blocking agent, the block is thereby removed, and as a result, a free isocyanate group is regenerated.

Examples of the blocking agent include, for example, a phenol-based blocking agent such as phenol, cresol, xylenol, nitrophenol, ethylphenol, hydroxydiphenyl, butylphenol, isopropylphenol, nonylphenol, octylphenol and methyl hydroxybenzoate; a lactam-based blocking agent such as ε-caprolactam, δ-valerolactam, γ-butyrolactam and β-propiolactam; glycolic acid; a glycolic acid ester such as methyl glycolate, ethyl glycolate and butyl glycolate; lactic acid; a lactic acid ester such as methyl lactate, ethyl lactate and butyl lactate; an alcohol-based blocking agent, such as methylolurea, methylohnelamine, diacetone alcohol, 2-hydroxyethyl acrylate, and 2-hydroxyethyl methacrylate; an oxime-based blocking agent such as formarnide oxime, acetamide oxime, acetoxime, methyl ethyl ketoxime, diacetyl monoxime, benzophenone oxime and cyclohexane oxime; an active methylene-based blocking agent such as dimethyl malonate, diethyl malonate, ethyl acetoacetate, methyl acetoacetate and acetylacetone; a mercaptan-based blocking agent such as butyl mercaptan, tert-butyl mercaptan, hexyl mercaptan, tert-dodecyl mercaptan, 2-mercaptobenzothiazole, thiophenol, methylthiophenol and ethylthiophenol; an acid amide-based blocking agent such as acetanilide, acetanisidide, acetotoluide, acrylamide, methacrylamide, acetic acid amide, stearic acid amide and benzamide; an imide-based blocking agent such as succinimide, phthalimide and maleimide; an amine-based blocking agent such as diphenylamine, phenylnaphthylamine, xylidine, N-phenylxylidine, carbazole, aniline, naphthylamine, butylamine, dibutylamine and butylphenylanime; an imidazole-based blocking agent such as imidazole and 2-ethylimidazole; a pyrazole-based blocking agent such as 3,5-dimethylpyrazole; a urea-based blocking agent such as urea, thiourea, ethyleneurea, ethylenethiourea and diphenylurea; a carbamic acid ester-based blocking agent such as phenyl N-phenylcarbamate; an imine-based blocking agent such as ethyleneimine and propyleneimine; and a sulfite-based blocking agent such as sodium bisulfite and potassium bisulfite.

Above all, from the viewpoint of the appearance of the coated film obtained, a pyrazole-based blocking agent and an oxime-based blocking agent may be suitably used, and among these, 3,5-dimethylpyrazole, methyl ethyl ketoxime, etc. may be more suitably used.

In the clear coating composition (Z), a hydroxyl group of the hydroxyl group-containing acrylic resin reacts with an isocyanate group of the polyisocyanate compound even at ordinary temperature (excluding the case where the compound is a blocked polyisocyanate compound) and therefore, from the viewpoint of storage stability, the coating composition is preferably prepared in such a manner that the main agent containing the hydroxyl group-containing acrylic resin is separated from the polyisocyanate compound, and used by mixing both immediately before use.

In the clear coating composition (Z), from the viewpoint of curability, scratch resistance, etc. of the coated film, the equivalent ratio (NCO/OH) of the isocyanate group of the polyisocyanate compound to the hydroxyl group of the hydroxyl group-containing acrylic resin is preferably from 0.6 to 1.4, more preferably from 0.8 to 1.2.

The clear coating composition (Z) is a coating composition containing the hydroxyl group-containing acrylic resin and the polyisocyanate compound as essential components, and the composition usually contains an organic solvent and may further contain, if desired, coating composition additives usually used in the coating composition field, such as curing catalyst, pigment, pigment dispersant, leveling agent, ultraviolet absorber, light stabilizer and plasticize.

Examples of the curing catalyst include, for example, an organic metal catalyst such as tin ocrylate, dibutyltin di(2-ethylhexanoate), dioctyltin di(2-ethylhexanoate), dioctyltin diacetate, dibutyltin dilaurate, dibutyltin oxide, dioctyltin oxide and zinc 2-ethylhexanoate; and a tertiary amine.

One of these compounds recited above as the curing catalyst may be used alone, or two or more thereof may be used in combination. The amount of the curing catalyst may vary depending on the kind but is usually from 0 mass % to 0.2 mass %, preferably on the order of 0 mass % to 0.1 mass %, relative to the total solids content of the hydroxyl group-containing acrylic resin and the polyisocyanate compound.

Examples of the pigment include, for example, a color pigment such as titanium oxide, zinc white, carbon black, cadmium red, molybdenum red, chrome yellow, chromium oxide, Prussian blue, cobalt blue, azo pigment, phthalocyanine pigment, quinacridone pigment, isoindoline pigment, threne-based pigment and perylene pigment; an extender pigment such as talc, clay, kaolin, baryta, barium sulfate, barium carbonate, calcium carbonate, silica and alumina white; and a metallic pigment such as aluminum powder, mica powder and titanium oxide-coated mica powder.

One of these pigments may be used alone, or two or more thereof may be used in combination. The content of the pigment may vary depending on the kind but is usually from 0 mass % to 20 mass %, preferably on the order of 0 mass % to 10 mass %, relative to the total solids content of the hydroxyl group-containing acrylic resin and the polyisocyanate compound.

The content of the color pigment above may vary depending on the kind, but the color pigment may be added to an extent not impairing the transparency.

As for the ultraviolet absorber, a conventional ultraviolet absorber may be used, and examples of the absorber include, for example, a benzotriazole-based absorber, a triazine-based absorber, a salicylic acid derivative-based absorber, a benzophenone-based absorber, and other ultraviolet absorbers.

In the case of using an ultraviolet absorber, from the viewpoint of weather resistance and yellowing resistance, the content of the ultraviolet absorber in the clear coating composition (Z) is usually from 0 to 10 parts by mass, preferably from 0.2 parts by mass to 5 parts by mass, more preferably from 0.3 parts by mass to 2 parts by mass, per 100 parts by mass of the total resin solids content.

As for the light stabilizer, a conventional light stabilizer may be used, and examples thereof include a hindered amine-based light stabilizer.

In the case of using a light stabilizer, from the viewpoint of weather resistance and yellowing resistance, the content of the light stabilizer in the clear coating composition (Z) is usually from 0 to 10 parts by mass, preferably from 0.2 parts by mass to 5 parts by mass, more preferably from 0.3 parts by mass to 2 parts by mass, per 100 parts by mass of the total resin solids content.

The method for applying the clear coating composition (Z) is not particularly limited, but a wet coated film may be formed, for example, by a coating method such as air spray coating, airless spray coating, rotary atomization coating and curtain coating. In these coating methods, an electrostatic charge may be applied, if desired. Among these methods, air spray coating and rotary atomization coating are preferred. The amount of the clear coating paint (Z) is preferably an amount providing a thickness of, in terms of the cured film thickness, usually from 10 μm to 50 μm, preferably from 20 μm to 40 μm.

In the case of performing air spray coating, airless spray coating or rotary atomization coating, it is preferred that the viscosity of the clear coating composition (Z) is appropriately adjusted to fall within a viscosity range suitable for the coating, usually in a viscosity range of approximately from 15 seconds to 60 seconds at 20° C. as measured by a Ford cup No. 4 viscometer, by using a solvent such as organic solvent.

As the organic solvent, an ester-based solvent such as ethyl acetate, butyl acetate and ethyl-3-ethoxypropionate, toluene, xylene, an aromatic mixed solvent (e.g., "SWASOL 1000", "SWASOL 1500" (trade names, both produced by Cosmo Oil Co., Ltd.), etc. may be used, and one of these may be used alone, or two or more thereof may be appropriately combined and used.

The clear coated film obtained by applying the clear coating composition (Z) may be cured per se by heating at a temperature of from normal temperature to about 150° C.

After applying the clear coating composition (Z), it may be possible, if desired, to have an interval at room temperature for approximately from 1 minute to 60 minutes or perform preheating at approximately from 50° C. to 110° C. for approximately from 1 minute to 30 minutes.

<Step (4)>

In the method for forming the multilayer coated film in an aspect of the present invention, the intermediate coated film, the base coated film and the clear coated film formed in the above steps (1) to (3), respectively, are heat-cured.

The clear coated film formed by applying the clear coating composition (Z) is usually heat-cured simultaneously with the uncured base coated film.

The heating may be performed by a normal heating method of a coated film such as hot-air heating, infrared heating or high-frequency heating. The heating temperature is preferably from 60° C. to 180° C., more preferably from 110° C. to 170° C., still more preferably from 130° C. to 160° C. The heating time is not particularly limited but is preferably from 10 minutes to 90 minutes, more preferably from 15 minutes to 60 minutes, still more preferably from 15 minutes to 30 minutes.

Before heat-curing, preheating may be appropriately performed. The preheating temperature is preferably from 40° C. to 110° C., more preferably from 50° C. to 110° C., and the preheating time is preferably from 30 seconds to 15 minutes, more preferably from 1 minute to 10 minutes.

By this heating, the multilayer coated film including an intermediate coated film, a base coated film and a clear coated film layer can be cured.

In the multilayer coated film obtained by the method of the present invention, from the viewpoint of finish appearance, the film thickness is preferably from 70 μm to 120 μm, more preferably from 80 μm to 100 μm, based on the cured coated film.

In the method of the present invention, in a part of an automotive body (for example, a portion to which front glass or rear glass is fixed), an adhesive layer is formed on the clear coated film of the multilayer coated film including the intermediate coated film, the base coated film and the clear coated film, obtained in the steps (1) to (4).

<Step (5)>

In the method of the present invention, in order to bond the automobile main body to a glass member, etc., an adhesive layer is formed on the clear coated film, generally in a frame shape corresponding to the shape of a glass member to be fixed.

As the adhesive for forming the adhesive layer, a resin composition usually used as an adhesive, a sealing agent or a coating agent, for example, urethane-based, acryl-based, silicone-based, modified silicone-based, polysulfide-based, epoxy-based and PVC-based adhesives, may be used.

Among these, from the viewpoint of adhesion to the clear coated film and high weather resistance, a urethane-based adhesive is preferably used. The urethane-based adhesive may be sufficient if it is an adhesive having an isocyanate group, and the adhesive may be any of a thermosetting adhesive, a thermoplastic adhesive, etc. and examples thereof include, for example, an adhesive containing methylene-bis(p-phenylene diisocyanate), hexamethylene diisocyanate, 1,6-hexamethylene diisocyanate, 2,4-tolylene diisocyanate, toluene diisocyanate, 1-chlorophenyl diisocyanate, 1,5-naphthylene diisocyanate, thiodipropyl diisocyanate, ethylbenzene-α-2-diisocyanate, or 4,4',4''-triphenylmethane triisocyanate. As for the urethane-based adhesive, either one-pack type or two-pack type may be used, but in particular, a one-pack moisture-curable urethane-based adhesive is suitably used.

Specific examples of the adhesive include, for example, "3740", "3765T" and "560F" (all trade names) produced by Sunstar Inc.; "WS373", "WS282", "WS202" and "WS252" (all trade names) produced by Yokohama Rubber Co., Ltd.; and "58702SFL" and "58702SFH" (both trade names) produced by Dow Chemical.

The method for applying the adhesive is not particularly limited, but from the viewpoint of productivity, in the automotive production line, coating by a robotic painting machine is widely performed in general. As for the coating amount of the adhesive, the adhesive is preferably applied to a film thickness of approximately from 3 mm to 6 mm based on the cured coated film.

In the case of bonding the multilayer coated film to a glass member, by the step (5), an adhesive layer is formed generally in a frame shape corresponding to the shape of a glass member to be fixed, on a part of an electrodeposition coated automotive body, a glass member such as front glass or rear window is laid thereon, and the adhesive layer is cured, whereby the glass member is fixed to the automotive body.

EXAMPLES

An aspect of the present invention is described more specifically below by referring to Examples and Comparative Examples. However, the present invention is not limited only to the following Examples. Here, both "parts" and "%" are on a mass basis, and the thickness of the coated film is based on the cured coated film.

In addition, the number average molecular weight of the resin is a value as measured by gel permeation chromatography (GPC) by using the calibration curve of standard polystyrene.

<Production of Intermediate Coating Composition (X)>

Production Examples 1 to 11

Intermediate Coating Compositions (X1) to (X11) having a viscosity of 30 seconds as measured with Ford cup No. 4 at 20° C. were obtained by mixing and stirring the raw materials (a hydroxyl group-containing polyester resin (A), a melamine resin (B), a pyrazole-blocked polyisocyanate compound (C), a pigment (D), and an organic solvent (E)) of each of the compositions shown in Table 1. The blending amount of each component is the solids amount (excluding the organic solvent (E)).

Intermediate Coating Compositions (X7) to (X11) are an intermediate coating composition for Comparative Examples.

In Table 1, the raw materials used are as follows.

Hydroxyl Group-Containing Polyester Resin (A-1):
Obtained by using trimethylolpropane, cyclohexane dimethanol, isophthalic acid and adipic acid and performing an esterification reaction in a usual manner; number average molecular weight: 4,500, hydroxyl value: 120, acid value: 10.

Hydroxyl Group-Containing Polyester Resin (A-2):
Obtained by using trimethylolpropane, cyclohexane dimethanol, isophthalic acid and adipic acid and performing an esterification reaction in a usual manner; number average molecular weight: 5,000, hydroxyl value: 90, acid value: 6.

Melamine Resin (B-1):
Imino group-containing methyl-butyl mixed etherified melamine; weight average molecular weight: 1,200.

Melamine Resin (B-2):
Imino group-containing butyl etherified melamine; number average molecular weight: 1,500.

Blocked Polyisocyanate Compound (C-1):
A compound in which hexamethylene diisocyanate is fully blocked with 3,5-dimethylpyrazole.

Blocked Polyisocyanate Compound (C-2):
A compound in which hexamethylene diisocyanate is fully blocked with methyl ethyl ketooxime.

Pigment (D-1): Titanium dioxide, average particle 0.25 μm.
Pigment (D-2): Barium sulfate, average 0.7 μm.
Pigment (D-3): Carbon black, average 0.02 μm.
Organic solvent (E-1): Butyl acetic acid.

<Production of Aqueous Base Coating Composition (Y)>

Production Example 12

100 Parts (solids content: 30 parts) of a hydroxy group-containing acrylic resin aqueous dispersion (i), 73 parts (solids content: 40 parts) of a hydroxyl group-containing water-soluble acrylic resin (ii), 50 parts (solids content: 30 parts) of a methyl-butyl mixed etherified melamine resin (solids content: 60%, weight average molecular weight: 2.000), 11 parts of an aluminum pigment paste, "GX-40A" (produced by Asahi Chemical Metals Ltd., metal content: 74%), and 10 parts of an aluminum pigment paste, "MH-8805" (produced by Asahi Chemical Metals Ltd., metal content: 68%) were blended, and adjusted by adding ASE- 60 (alkali-swellable thickener, trade name, produced by Rohm & Haas Co.), 2-(dimethylamino)ethanol and deionized water, and diluted by mixing and stirring to a viscosity appropriate for the coating to obtain Aqueous Base Coating Composition (Y1) having a pH of 8.0 and a coating composition solids content of 23%.

Hydroxyl Group-Containing Acrylic Resin Aqueous Dispersion (i):

130 Parts of deionized water and 0.52 parts of "AQUALON KH-10" (trade name, produced by Dai-ichi Kogyo Seiyaku Co., Ltd., polyoxyethylene alkyl ether sulfate ester ammonium salt, active ingredient: 97%) were charged into a reactor equipped with a thermometer, a thermostat, a stirrer, a reflux condenser, a nitrogen-introducing tube and a chopping funnel, stirred/mixed in a nitrogen stream, and heated to 80° C. Subsequently, a 1% portion of the total amount of Monomer Emulsion (1) below and 5.3 parts of an aqueous 6% ammonium persulfate solution were introduced into the reactor, and the system was kept at 80° C. for 15 minutes. The remaining Monomer Emulsion (1) was then added dropwise over 3 hours to the reactor kept at the same temperature. After the completion of dropwise addition, the mixture was aged for 1 hour.

Thereafter, Monomer Emulsion (2) below was added dropwise over 1 hour. The mixture was aged for 1 hour, then cooled to 30° C. while gradually adding 40 parts of an aqueous 5% 2-(dimethylamino)ethanol solution to the reactor, and filtered through a 100-mesh nylon cloth to obtain, as a filtrate, a hydroxyl group-containing acrylic resin aqueous emulsion (i) having an average particle diameter of 120 nm (as measured using a submicron particle size distribution analyzer "COULTER Model N4" (manufactured by Beckman Coulter, Inc.) at 20° C. after dilution with deionized water) and a solids concentration of 30%. The obtained hydroxyl group-containing acrylic resin aqueous dispersion (i) had an acid value of 33 mg KOH/g and a hydroxyl value of 25 mg KOH/g.

Monomer Emulsion (1):

42 Parts of deionized water, 0.72 part of "AQUALON KH-10", 2.1 parts of methylenebisacrylamide, 2.8 parts of styrene, 16.1 parts of methyl methacrylate, 28 parts of ethyl acrylate, and 21 parts of n-butyl acrylate were stirred mixed to obtain Monomer Emulsion (1).

Monomer Emulsion (2):

18 Parts of deionized water, 0.31 parts of "AQUALON KH-10", 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed/stirred to obtain Monomer Emulsion (2).

Hydroxyl Group-Containing Water-Soluble Acrylic Resin (ii):

35 Parts of propylene glycol monopropyl ether was charged into a flask, and the temperature was raised to 85° C. A mixture of 30 parts of methyl methacrylate, 20 parts of 2-ethylhexyl acrylate, 29 parts of n-butyl acrylate, 15 parts of hydroxyethyl acrylate, 6 parts of acrylic acid, 15 parts of propylene glycol monopropyl ether, and 2.3 parts of 2,2'-azobis(2,4-dimethylvaleronitrile) was added dropwise to the flask over 4 hours and after the completion of dropwise addition, the mixture was aged for 1 hour. Subsequently, a mixture of 10 parts of propylene glycol monopropyl ether and 1 part of 2,2'-azobis(2,4-dimethylvaleronitrile) was further added dropwise to the flask over 1 hour and after the completion of dropwise addition, the mixture was aged for 1 hour. Thereafter, 7.4 parts of diethanolamine was further added to obtain a hydroxyl group-containing water-soluble acrylic resin solution (ii) having a solids concentration of 55%, an acid value of 47 mg KOH/g, and a hydroxyl value of 72 mg KOH/g.

<Production of Clear Coating Composition (Z)>

Production Example 13

After a principal ingredient composed of 64 parts of a hydroxyl group-containing acrylic resin (iii), 2 parts of UV1164 (produced by Ciba-Geigy, ultraviolet absorber) and 2 parts of HALS292 (produced by Ciba-Geigy, light stabilizer) was dissolved in ethyl acetate, the principal ingredient and 36 parts of curing agent N-3300 (produced by Sumika Bayer Urethane Co., Ltd., isocyanurate of hexamethylene diisocyanate, solids content: 100%, NCO content: 21.8%) were stirred/mixed using a disper, and the mixture was diluted with a mixed solvent of ethyl acetate and butyl acetate (mass ratio: 1/1) and thereby adjusted to a viscosity of 17 seconds at 20° C. as measured with Ford cup No. 4 to obtain Clear Coating Composition (Z1).

Hydroxyl Group-Containing Acrylic Resin (iii):

A monomer composition having a monomer formulation of styrene/cyclohexyl methacrylate/2-ethylhexyl acrylate/2-hydroxyethyl acrylate/acrylic acid=20/26/19/34/1 was prepared and polymerized using, as the polymerization initiator, 1 part of di-tert-amyl peroxide per 100 parts of the monomer composition to obtain a hydroxyl group-containing acrylic resin (iii). The resin had a solids content of 60 mass % (diluting solvent: ethoxyethyl propionate), a weight average molecular weight of 10,000, a hydroxyl value of 164 mg KOH/g, and an acid value of 8 mg KOH/a.

<Preparation of Test Plate>

(Preparation of Test Object to be Coated)

"ELECTRON GT-10" (trade name, produced by Kansai Paint Co., Ltd., a thermosetting epoxy resin-based cationic electrodeposition coating composition) was applied onto a zinc phosphated cold-rolled steel plate by electrodeposition to a film thickness of 20 μm and heat-cured at 170° C. for 30 minutes to prepare a test object to be coated.

Example 1

(1) intermediate Coating composition (X1) obtained in Production Example 1 was applied onto the test object to be coated by a hand spray gun to provide a cured coated film of 15 μm, then allowed to stand for 7 minutes, and baked at 140° C. for 30 minutes.

Subsequently, Aqueous Base Coating Composition (Y1) obtained in Production Example 12 was applied onto the intermediate coated film by a hand spray gun to provide a cured film thickness of 10 μm, then allowed to stand for 5 minutes, and preheated at 80° C. for 3 minutes.

Thereafter, Clear Coating Composition (Z1) prepared in Production Example 13 was applied onto the uncured base coated film by a hand spray gun to provide a cured film thickness of 10 to 15 μm, then allowed to stand for 7 minutes, and heated at 140° C. for 30 minutes, and the whole of the multilayer coated film was thereby heat-cured to prepare a test plate.

The test plate was further coated with a urethane-based adhesive (trade name: "3740", produced by Sunstar Inc., a wind-shielding agent for automobiles) such that the coated layer has a width of 20 mm, a thickness of 3 mm, and a length of 100 mm or more, then covered with a release paper, and uniformly pressed with a flat plate. After removing the flat plate, the test plate was allowed to stand at a temperature of 23±2° C. and a humidity of 50±5% for 72 hours, and the adhesive was thereby cured. After that, the release paper was peeled to prepare Test Plate A for WDB (glass adhesion) test.

(2) Intermediate Coating composition (X1) obtained in Production Example 1 was applied onto the test object to be coated by a hand spray gun to provide a cured coated film of 35 μm, then allowed to stand for 7 minutes, and baked at 140° C. for 30 minutes.

Subsequently, Aqueous Base Coating Composition (Y1) obtained in Production Example 12 was applied onto the intermediate coated film by a hand spray gun to provide a cured film thickness of 15 μm, then allowed to stand for 5 minutes, and preheated at 80° C. for 3 minutes.

Thereafter, Clear Coating Composition (Z1) prepared in Production Example 13 was applied onto the uncured base coated film by a hand spray gun to provide a cured film thickness of 35 μm, then allowed to stand for 7 minutes, and heated at 140° C. for 30 minutes, and the whole of the multilayer coated film was thereby heat-cured to prepare Test Plate B for finish appearance (smoothness) and chipping resistance tests.

Examples 2 to 6 and Comparative Examples 1 to 5

Each test plate (two kinds) was prepared in the same manner as in Example 1 except that in Example 1, Intermediate Coating Composition (X1) was changed to any one of Intermediate Coating Compositions (X2) to (X11).

With respect to each of the test plates obtained, the WDB (glass adhesion), chipping resistance and finish appearance (smoothness) tests were performed based on the following test methods and evaluation methods. In addition, the elongation at break, Young's modulus and Tukon hardness of the intermediate coated film were measured. The test results are shown together in Table 1.

<WDB (Glass Adhesion)>

Each test plate A prepared above was immersed in a constant-temperature water bath set at 40° C. for 240 hours, then immersed in water at 23° C. for 1 hours and thereby cooled, and the following peel test was then performed.

Cuts reaching the coated film surface were formed at an angle of about 60° relative to the coated film by a cutter knife at intervals of 2 mm to 3 mm while manually pulling the cured adhesive layer in the direction at 90° or more relative to the coated film. The peeled state after peeling the adhesive layer was evaluated in accordance with the following criteria "AA", "A", "B", and "C".

AA: Separation of the adhesive layer was not observed, and exposure of the coated film was not observed either.

A: The coated film was not broken and only the adhesive layer was separated by causing cohesion failure, but adhesion of the coated film to the adhesive layer was substantially maintained.

B: The coated film was separated by causing cohesion failure.

C: Peeling was observed at the interface between the coated film and the adhesive layer.

<Finish Appearance (Smoothness)>

The smoothness of the multilayer coated film surface of each test plate B prepared above was evaluated with an eye in accordance with the following criteria "AA", "A", "B", and "C".

AA: Good
A: Slightly good
B: Slightly poor
C: Poor

<Chipping Resistance>

Each test plate B prepared above was placed on a sample holder of a flying stone chipping tester Model JA-400 (a chipping test device) manufactured by Suga Test Instruments Co., Ltd., and 300 g of crushed stone of No. 6 was hit against the test plate at an angle of 90° by blowing compressed air at 0.5 MPa from a distance of 35 cm at −20° C. Thereafter, the resulting test plate B was washed with water and dried, and a cloth adhesive tape (produced by Nichiban Co., Ltd.) was applied to the coating surface and after peeling off the tape, the occurrence, etc. of scratches in the coated film was observed with an eye and evaluated in accordance with the following criteria "AA", "A" "B", and "C".

AA: The size of scratch was extremely small (1.2 mm or less), and the raw steel plate was not exposed.

A: The size of scratch was small (from more than 1.2 mm to less than 2.0 mm), and the raw steel plate was not exposed.

B: The size of scratch was small (from more than 1.2 mm to less than 2.0 mm), but the raw steel plate was exposed.

C: The size of scratch was large (2.0 mm or more), and the raw steel plate was also largely exposed.

TABLE 1

| | | | | Example | | | | | | Comparative Example | | | | |
|---|---|---|---|---|---|---|---|---|---|---|---|---|---|---|
| | | | | 1 X1 | 2 X2 | 3 X3 | 4 X4 | 5 X5 | 6 X6 | 1 X7 | 2 X8 | 3 X9 | 4 X10 | 5 X11 |
| Intermediate coating composition (X) | (A) Hydroxyl group-containing polyester resin | A-1 | (parts) | 15 | 15 | 15 | 15 | 15 | 20 | 15 | 20 | 15 | 15 | 15 |
| | | A-2 | (parts) | 45 | 45 | 50 | 45 | 45 | 40 | 45 | 40 | 45 | 45 | 51 |
| | (B) Melamine resin | B-1 | (parts) | 10 | 5 | 20 | | 10 | 10 | 10 | 10 | 10 | 3 | 24 |
| | | B-2 | (parts) | | | | 10 | | | | | | | |
| | (C) Pyrazole-blocked polyisocyanate compound | C-1 | (parts) | 30 | 35 | 15 | 30 | 30 | 30 | 30 | 30 | | 37 | 10 |
| | | C-2 | (parts) | | | | | | | | | 30 | | |
| | (D) Pigment | D-1 | (parts) | 75 | 75 | 75 | 75 | 10 | 150 | 7 | 170 | 75 | 75 | 75 |
| | | D-2 | (parts) | 25 | 25 | 25 | 25 | 60 | 0 | 51 | 0 | 25 | 25 | 25 |
| | | D-3 | (parts) | 0.5 | 0.5 | 0.5 | 0.5 | 1 | 0.2 | 2 | 0.2 | 0.5 | 0.5 | 0.5 |
| | (E) Organic solvent | E-1 | (parts) | 30 | 30 | 30 | 30 | 30 | 30 | 30 | 30 | 30 | 30 | 30 |
| Aqueous base coating composition (Y) | | | | | | | | | Y1 | | | | | |
| Clear coating composition (Z) | | | | | | | | | Z1 | | | | | |
| Adhesive | | | | | | | | | Urethane-Based Adhesive | | | | | |
| PWC of pigment in intermediate coating composition (%) | | | | 50.1 | 50.1 | 50.1 | 50.1 | 41.5 | 60.0 | 37.5 | 63.0 | 50.1 | 50.1 | 50.1 |

TABLE 1-continued

| | | Example | | | | | | Comparative Example | | | | |
|---|---|---|---|---|---|---|---|---|---|---|---|---|
| | | 1<br>X1 | 2<br>X2 | 3<br>X3 | 4<br>X4 | 5<br>X5 | 6<br>X6 | 1<br>X7 | 2<br>X8 | 3<br>X9 | 4<br>X10 | 5<br>X11 |
| Intermediate coated film | Elongation at break % | 70 | 90 | 50 | 75 | 80 | 40 | 95 | 30 | 100 | 110 | 40 |
| | Young's modulus MPa | 1,000 | 800 | 1,400 | 1,000 | 600 | 1,600 | 600 | 1,700 | 500 | 500 | 1,700 |
| | Tukon Hardness | 6 | 4 | 8 | 6 | 3 | 9 | 2 | 10 | 2 | 2 | 10 |
| Evaluation of Multilayer coated film | Finish appearance (smoothness) | AA | A | AA | A | A | A | B | B | B | B | AA |
| | Chipping resistance | AA | AA | A | A | A | A | B | B | B | AA | B |
| | WDB (glass adhesion) | AA | A | AA | AA | A | AA | B | AA | B | C | AA |

As seen from the results in Table 1, in all of Examples 1 to 6, a multilayer coated film having good performance in terms of both the chipping resistance and the adhesion to a glass member and also having excellent finish appearance (smoothness) could be formed. On the other hand, in Comparative Examples 1 to 5, it was impossible to satisfy both the chipping resistance and the adhesion to a glass member, and the finish appearance was not satisfied either.

While the present invention has been described in detail and with reference to specific embodiments thereof, it will be apparent to one skilled in the art that various changes and modifications can be made therein without departing from the spirit and scope thereof.

What is claimed is:

1. A method for forming a multilayer coated film on a part of an electrodeposition coated automotive body, the method comprising the following steps (1) to (5):
   step (1): applying an intermediate coating composition (X) to an electrodeposition coated film, thereby forming an intermediate coated film on the electrodeposition coated film;
   step (2): applying an aqueous base coating composition (Y) to the intermediate coated film formed in the step (1), thereby forming a base coated film on the intermediate coated film;
   step (3): applying a clear coating composition (Z) containing a hydroxyl group-containing acrylic resin and a polyisocyanate compound to the base coated film formed in the step (2), thereby forming a clear coated film on the base coated film;
   step (4): heat-curing the intermediate coated film formed in the step (1), the base coated film formed in the step (2) and the clear coated film formed in the step (3); and
   step (5): forming an adhesive layer on the clear coated film,
   wherein the intermediate coating composition (X) contains a hydroxyl group-containing polyester resin (A), a melamine resin (B), a pyrazole-blocked polyisocyanate compound (C), a pigment (D), and an organic solvent (E), a content ratio (B/C) of the melamine resin (B) to the pyrazole-blocked polyisocyanate compound (C) is from 5/35 to 20/15 in terms of solid content ratio, and a concentration (PWC) of the pigment (D) is from 40% to 60%, and
   the cured intermediate coated film after heat-curing the intermediate coated film has, at 20° C., an elongation at break of 40% to 90%, a Young's modulus of 600 MPa to 1,600 MPa, and a Tukon hardness of 3 to 9.

2. The method according to claim 1, wherein a total solid content of the melamine resin (B) and pyrazole-blocked polyisocyanate compound (C) relative to a total solid content of the hydroxyl group-containing polyester resin (A), melamine resin (B) and pyrazole-blocked polyisocyanate compound (C) in the intermediate coating composition (X) is from 20 mass % to 50 mass %.

3. The method according to claim 1, wherein in the step (1), the intermediate coating composition (X) is applied to have a film thickness of 10 μm to 40 μm based on the cured coated film.

4. The method according to claim 2, wherein in the step (1), the intermediate coating composition (X) is applied to have a film thickness of 10 μm to 40 μm based on the cured coated film.

* * * * *